United States Patent Office 3,574,543
Patented Apr. 13, 1971

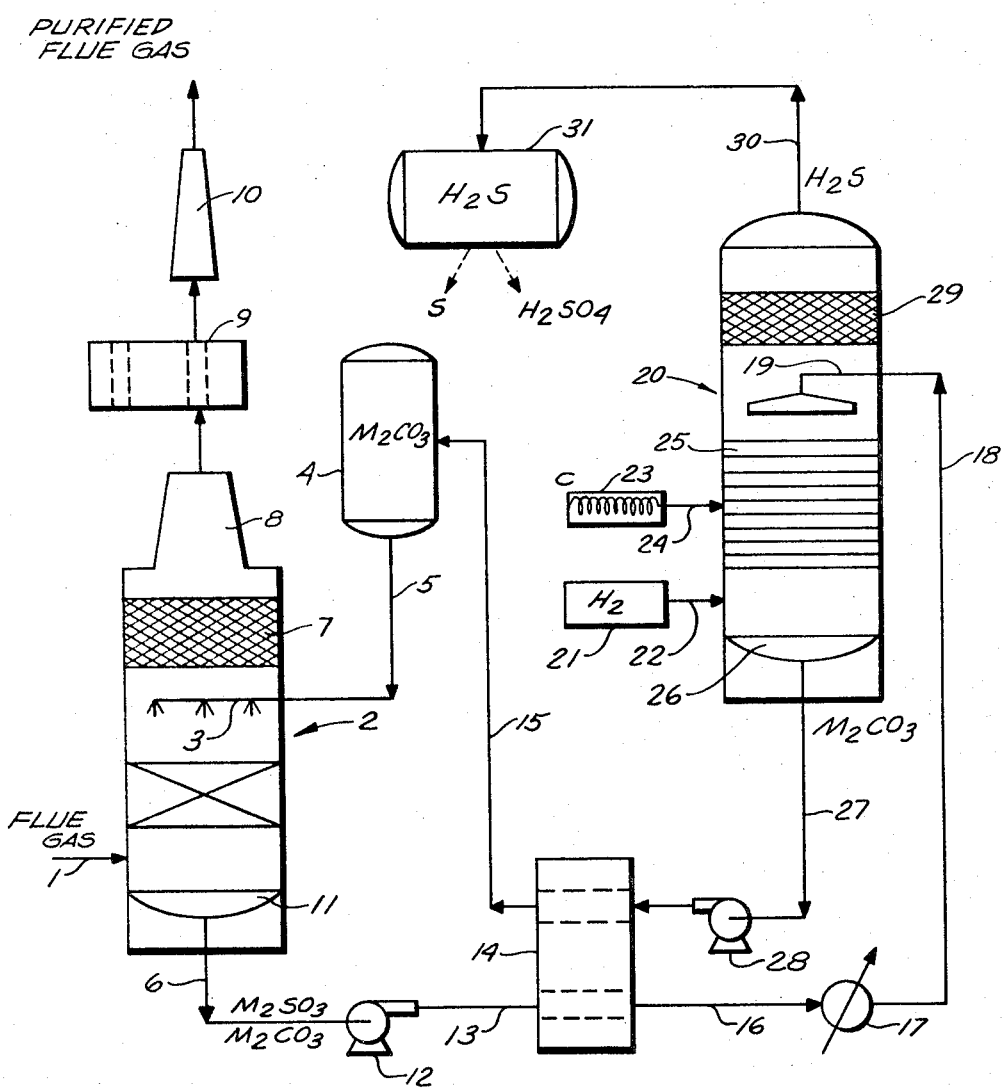

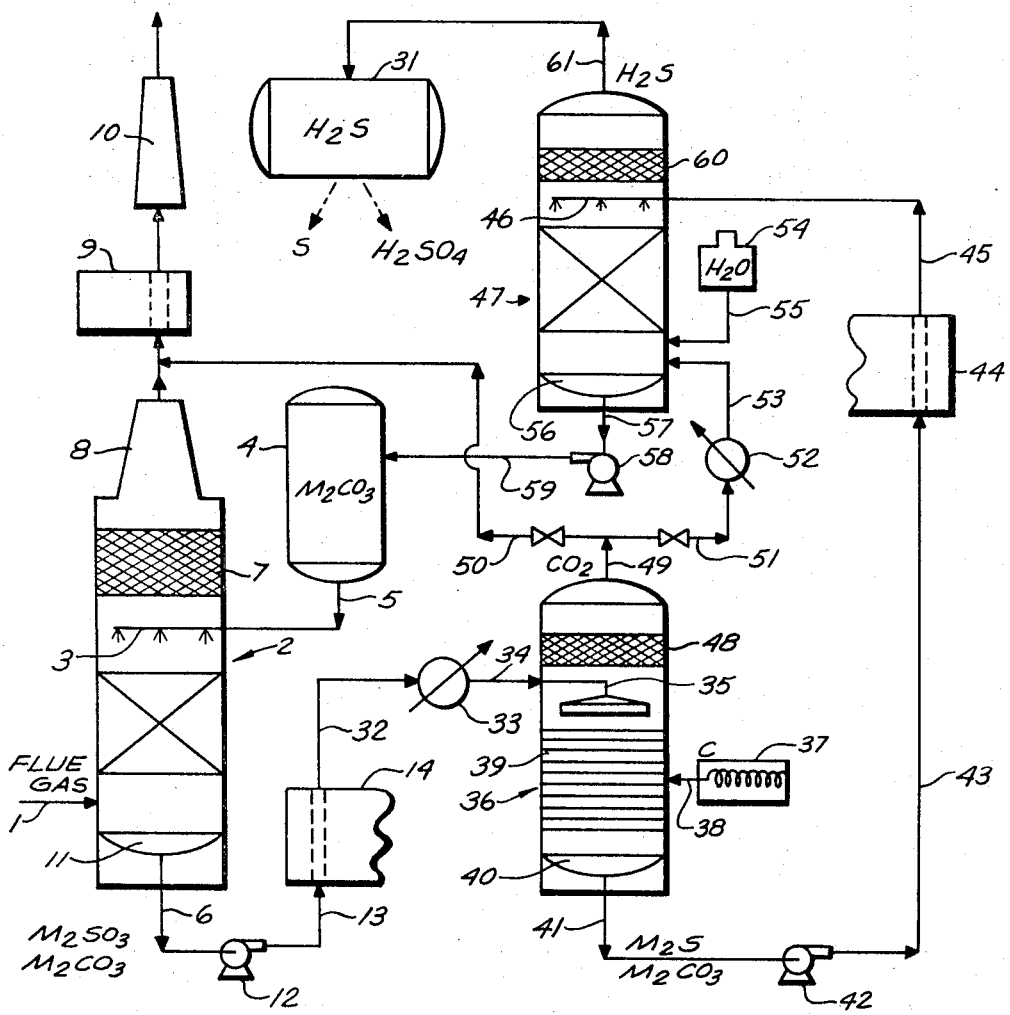

3,574,543
CARBONACEOUS PROCESS FOR RECOVERING SULFUR VALUES
Laszlo A. Heredy, Canoga Park, Calif., assignor to North American Rockwell Corporation
Original application May 15, 1967, Ser. No. 638,365, now Patent No. 3,438,727, dated Apr. 15, 1969. Divided and this application Nov. 26, 1968, Ser. No. 779,118
The portion of the term of the patent subsequent to Apr. 15, 1986, has been disclaimed
Int. Cl. C01b 17/16
U.S. Cl. 23—181                              10 Claims

ABSTRACT OF THE DISCLOSURE

A method for recovering sulfur values from a molten salt mixture containing alkali metal sulfate or sulfite by either a one-stage or two-stage treatment of the molten solution. For single-stage treatment, the alkali metal sulfate- or sulfite-containing molten solution is reacted with a hydrocarbonaceous composition, preferably carbon and hydrogen, to form hydrogen sulfide and alkali metal carbonates in the molten salt. For the two-stage treatment, the sulfate- or sulfite-containing molten solution is first treated with a carbonaceous material, preferably carbon, to form alkali metal sulfide, which is then treated with a gaseous mixture containing steam and carbon dioxide to form hydrogen sulfide and alkali metal carbonates in the molten salt.

CROSS REFERENCES TO RELATED APPLICATIONS

This is a division of application Ser. No. 638,365, filed May 15, 1967, now U.S. Pat. 3,438,727.

The method for removing sulfur dioxide from flue gas by absorption of the sulfur dioxide in a molten alkali metal carbonate mixture to provide a feedstock for the one-stage or two-stage process of the present invention is described in U.S. Pat. 3,438,722.

Other processes that may also be utilized for treatment of the resultant absorbent solution provided by the process described in U.S. 3,438,722 are described in the following patent applications, all filed of even date herewith and assigned to the assignee of the present invention: "Two-Stage Process for Recovering Sulfur Values," S.N. 779,176; "Carbon Oxide Regenerant for Sulfur Production," S.N. 779,175; "Carbonaceous Process for Sulfur Production," S.N. 779,173, now U.S. Pat. 3,516,796; and "Electrochemical Process for Recovering Sulfur Values," S.N. 779,119.

BACKGROUND OF THE INVENTION

This invention relates to a process for the removal of sulfur compounds from molten salts. It particularly relates to a process wherein sulfur values are recovered from a molten salt mixture containing alkali metal sulfate or sulfite in a single-stage or two-stage process. Hydrogen sulfide is recovered together with alkali metal carbonates in the molten salt by treatment of the sulfate- or sulfite-containing molten solution in a single-stage process using carbon and hydrogen or in a two-stage process using the sequential steps of reduction by carbon followed by a reformation step using steam and carbon dioxide.

Sulfur oxides, principally as sulfur dioxide, are present in the waste gases discharged from many metal refining and chemical plants and in the flue gases from power plants generating electricity by the combustion of fossil fuels. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible byproducts, such as elemental sulfur and sulfuric acid, that may be ultimately obtained from the recoverable sulfur values have virtually unlimited markets as basic raw materials, they sell for relatively low figures. Consequently, low-cost recovery processes are required. The absorption process described in U.S. Pat. 3,438,722, wherein sulfur dioxide present in flue gas is absorbed in a molten alkali metal carbonate mixture provides one source for a molten salt composition treated by the present process.

SUMMARY OF THE INVENTION

It is an object of the present invention to provide a highly efficient method for recovering sulfur values from molten salt compositions using inexpensive, readily available materials and avoiding the use of expensive equipment. A one-stage or two-stage process is provided utilizing carbon for recovering sulfur values as hydrogen sulfide, readily convertible to sulfur or sulfuric acid as marketable products.

In accordance with this invention, a sulfur removal process is provided comprising reacting a molten salt mixture containing alkali metal sulfates, alkali metal sulfites, or a mixture thereof in either a one-stage or two-stage process.

One source of the sulfate- or sulfite-containing molten salt mixture treated by the present process is provided by the absorption process shown in U.S. 3,438,722 wherein.

Sulfur oxides present in a hot combustion gas generally produced by burning a sulfur-containing hydrocarbon or fossil fuel are removed from the combustion gas by contacting the gas at a temperature of at least 350° C., with a molten salt mixture containing alkali metal carbonates ($M_2CO_3$) as active absorbent to thereby remove the sulfur oxides. The melting temperature of the salt mixture is preferably between 350 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite.

In copending application S.N. 779,172, a single-stage treatment is described in which the resultant molten absorbent solution containing the absorbed sulfur values obtained by using the process shown in U.S. 3,438,722, is treated with a gaseous mixture containing hydrogen and a carbon oxide.

In the present one-stage process, the sulfate- or sulfite-containing molten solution is treated with a hydrocarbonaceous reactant, preferably consisting of hydrogen gas and a solid or liquid carbonaceous material, preferably an activated carbon, at a temperature between 350 and 650° C., preferably between 450 and 550° C., in accordance with the following exemplary equations:

$M_2SO_3 + C + H_2 \rightarrow M_2CO_3 + H_2S$ 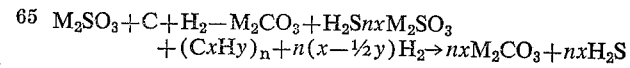
$+ (C_xH_y)_n + n(x - \tfrac{1}{2}y)H_2 \rightarrow nxM_2CO_3 + nxH_2S$ where, in a preferred melt composition, M is a ternary mixture of Na, Li and K; and where, $x$ and $y$ are smaller integers, generally below 10, $n$ has integral values increasing with the complexity of the hydrocarbonaceous material, which may also contain other atoms in the molecule. Where $y$ has a value at least twice that of $x$, the need for supplementary hydrogen may be avoided.

In copending application S.N. 779,176 is shown a two-stage treatment comprising the two sequential steps of reduction and reformation. For the reduction step in the copending application, a gas mixture containing hydrogen, CO, or a mixture thereof is utilized. For the reformation step, the molten salt obtained from the reduction step is treated with a gaseous mixture of steam and carbon dioxide.

In the two-stage process of the present invention, there is utilized in the reduction step a carbonaceous material, preferably in solid or liquid form, and preferably as an activated carbon. The reduction reaction is performed at a temperature between 350 and 650° C., preferably between 500 and 600° C. The molten product of the reaction, consisting principally of $M_2S$ in excess $M_2CO_3$, is separated from the evolved gases containing carbon dioxide. The $M_2CO_3$ is then reformed by treatment of the sulfide-containing molten salt with steam and carbon dioxide, at a temperature between 325 and 450° C. at which the salt is molten, preferably between 400 and 425° C. according to the following equation:

$$M_2S + H_2O + CO_2 \rightarrow M_2CO_3 + H_2S$$

At least a portion of the reactant gas mixture used may be provided by the resultant gaseous mixture obtained from the reduction step. Lower temperatures favor this reformation reaction, which may even be performed with a solidified sulfide-carbonate salt at a temperature as low as 100° C. The present reformation step is essentially similar to that shown in copending application S.N. 779,176.

For both the one-stage and two-stage processes of the present invention, the final resultant molten mixture of the alkali metal carbonates is recovered for recirculation in the process, and the obtained hydrogen sulfide gas is recovered as a suitable feedstock for a sulfuric acid plant or for production of elemental sulfur.

BRIEF DESCRIPTION OF THE DRAWING

FIG. 1 shows a schematic flow diagram illustrating the single-stage process for a preferred embodiment of the invention in conjunction with an absorption stage, and FIG. 2 shows a schematic flow diagram illustrating the two-stage process, comprising the sequential steps of reduction and reformation for a preferred embodiment of the invention in conjunction with an absorption stage, both of these embodiments being directed to the treatment of hot combustion gases obtained by the burning of a sulfur-containing fossil fuel in an electric generating plant.

DESCRIPTION OF THE PREFERRED EMBODIMENTS

The present invention is broadly directed to improved single-stage and two-stage processes for recovering sulfur values as hydrogen sulfide from a molten salt mixture containing alkali metal sulfates and sulfites. The process will be particularly described in conjunction with a prior absorption stage, not a part of this invention, which may be employed to provide one source for a molten salt composition treated by the present process. The absorption stage per se is shown in U.S. 3,438,722. The reformation step of the two-stage process is shown in S.N. 779,176, both of which disclosures are incorporated herein by reference, and these disclosures should be consulted for fuller details of the absorption stage and the reformation steps, respectively.

In the absorption stage, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. In a preferred aspect for practicing the absorption stage, the combustion gas is treated with a molten ternary salt mixture of the carbonates of lithium, sodium, and potassium, molten at 400° C. to connect the $SO_2$ present to alkali metal sulfite according to the following equation:

$$M_2CO_3 + SO_2 \rightarrow M_2SO_3 + CO_2$$

where M denotes a ternary mixture of Li, Na, K, excess $M_2CO_3$ molten salt being used as carrier solvent. Suitably, this preferred reaction is performed at a temperature between 395 and 600° C. and particularly between 400 and 450° C., approximately corresponding to the temperature of a typical power plant flue gas.

The present invention directed to the recovery of sulfur values as hydrogen sulfide from certain molten salt compositions will be particularly illustrated with respect to the prior removal of sulfur oxides from hot combustion gases obtained by the burning of sulfur-containing fossil fuels, particularly in electric generating plants. The absorption stage for both embodiments of the invention will be essentially similar, and similar numbers will be used for both FIGS. 1 and 2 in describing the absorption stage.

Referring to both FIGS. 1 and 2 of the drawing, a flue gas obtained from the combustion of a sulfur-containing coal at a temperature of about 425±25° C. is admitted by way of a conduit 1 to an absorber unit 2. For a typical 1000 m.w.(e.) coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-m.w.(e.) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of a conduit 5 connected to spray distributor 3 at a flow rate adjusted to provide about 10–30 mole percent sulfite content in the effluent molten salt stream leaving the bottom of absorber 2 by way of a conduit 6.

After contacting the molten carbonate spray, the desulfurized flue gas flows past distributor 3 into a wire demister 7, which is about 1 foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. A mixture containing approximately equal amounts by weight of the carbonates of potassium, lithium, and sodium has a melting point of about 395° C., about that of the eutectic composition. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

Other nonreactive molten salts may be combined with the alkali metal carbonates to serve as inexpensive diluents or to lower the temperature. For example, a lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5-10 mole percent of alkali metal carbonate is preferable. Illustrative of such a suitable mixture is one utilizing LiCl-KCl eutectic (M.P. 358° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures contain, in mole percent, 15–60 K⁺, 40–85 Li⁺, and 0–20 Na⁺ as cations and 10–98 Cl⁻ and 2–90 CO₃⁼ as anions.

Although the melting points of the pure alkali metal sulfites and sulfides are considerably higher than those of the mixed alkali metal carbonates, if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between the molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about 425±25° C.

Referring now to FIG. 1 describing the single-stage process, the sulfite-carbonate mixture leaves heat exchanger 14 at an increase in temperature. At the same time the temperature of regenerated molten carbonate feedstock being returned to storage vessel 4 by way of a conduit 15 is lowered. The sulfite-carbonate mixture leaves heat exchanger 14 by way of a conduit 16 and passes through a heater 17, which is optionally utilized for further increasing the temperature of the mixture, where required, to about 500±25° C. The mixture leaves heater 17 through a conduit 18 where it is fed into a trickle distributor 19 in a regenerator unit 20. While other liquid-solid contact techniques may be used, it is generally preferred to trickle the molten liquid over the solid carbonaceous bed while feeding the hydrogen upwardly therethrough in order to obtain optimum contact conditions for the regeneration reaction. For wholly gaseous hydocarbonaceous reactant materials, a spray distributor is preferably used for the molten liquid, the solid carbonaceous bed being eliminated.

The overall chemical reaction in the single-stage regenerator unit involves concurrent reduction of the alkali metal sulfite to hydrogen sulfide and regeneration of alkali metal carbonate by treatment of the alkali metal sulfite-carbonate melt with a hydrocarbonaceous composition effectively providing reactive hydrogen and carbon in accordance with the following exemplary equation:

$$M_2SO_3 + C + H_2 \rightarrow M_2CO_3 + H_2S$$

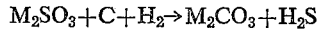

$H_2S$ is obtained from the reduction of the alkali metal sulfite, although other reaction products from side reactions may be additionally obtained. While the exact mechanism of regeneration is but imperfectly understood, it is believed, without intending to be limited by this explanation, that alkali metal sulfide may be formed as an intermediate reaction product. However, this compound, where formed, is converted during the course of the reaction to carbonate and hydrogen sulfide by the gaseous products formed during the reaction, the extent of conversion depending upon reaction conditions in the regenerator.

The hydrocarbonaceous material utilized in the regenerator may be obtained from a simple or complex hydrocarbonaceous composition $(C_xH_y)_n$ or by separately feeding into the regenerator a hydrogen-containing gas and a carbonaceous material, preferably in solid or liquid form, an activated carbon being preferred. The activated carbon is preferably in the form of hard, dense granules or pellets. From the point of view of process economics, there may be utilized in the regenerator unit as a single substance or supplemented by a hydrogen-containing gas any of the various liquid or solid waste or byproducts obtained from petroleum and coal-refining processes, such as sludges, cokes, asphalts, tars, pitches, and the like. These substances ordinarily are heavily contaminated with sulfur-containing materials, are of little or no economic utility, and their disposal frequently presents problems because of the large volumes in which they are obtained and their contaminant nature. The present process may ideally utilize such materials, the sulfur contaminants present actually constituting an asset with respect to sulfur recovery. Basically, for the single-stage regeneration process of the present invention, the effective hydrocarbonaceous feed materials are reactive carbon and reactive hydrogen, that is, carbon and hydrogen in an available form for the regeneration reaction, howsoever derived, whether in the initial form of a hydrocarbonaceous substance designated as $(C_xH_y)_n$, or whether pure hydrogen gas and carbon are used as reactant materials. Or hydrogen may be generated in situ by reaction of steam with a carbonaceous material. Generally it is preferred in starting the process that an activated carbon be present in order to present a large surface area for promoting the reaction. Thereafter, other carbonaceous or hydrocarbonaceous materials may be added to the regenerator.

Referring again to FIG. 1, where a preferred embodiment using hydrogen and carbon is shown, a source of hydrogen gas 21 is used to provide a supply of reactive hydrogen which enters the base of regenerator 20 by way of a conduit 22. A source of carbon 23 is used to provide the reactive carbonaceous component fed by means of a screw drive 24 to a supported bed 25 in regenerator unit 20. Where the carbonaceous material in bed 25 is in the form of a highly porous active carbon, the downward trickling of the molten sulfite-carbonate mixture and the upward passage of the hydrogen gas through the bed provide extremely intimate contact among all the reactant substances and result in a high rate of reaction and conversion. Ordinarily, the hydrocarbonaceous material, e.g., hydrogen gas and carbon, used as the source of active hydrogen and carbon, is present in excess. Where desired the off-gas from the regenerator may be recycled for completion of the regeneration reaction. The molten alkali metal carbonate, including both regenerated and carrier carbonate, is collected in a sump 26 at the base of regenerator 20, from where it is fed by way of a conduit 27 by means of a pump 28 to heat exchanger 14, where it loses heat, and then is returned to storage vessel 4 by way of conduit 15. The reconverted carbonate is then recycled to absorber 2 by way of conduit 5.

The hydrogen sulfide-rich gas mixture produced in the regeneration reaction may also contain minor amounts of COS, S, $CO_2$, and $H_2O$. This gas mixture passes through a demister 29, which removes entrained liquid particles, and leaves regenerator 20 by way of a conduit 30 where it is fed to a storage vessel 31 of a hydrogen sulfide processing plant.

In the embodiment of the invention illustrated in FIG. 2 is shown the two-stage process of the present invention, comprising the steps of reduction and reformation. This two-stage process requires additional equipment compared with the single-stage process shown in FIG. 1. However, for certain feedstock and equipment conditions and requirements, the two-stage process is advantageous compared with the single-stage process in providing greater overall single cycle product conversion and yields and in permitting optimization of each of the reduction and reformation steps of the two-stage process. Thus, the optimum reaction parameters, particularly temperature, pressure and contact time, are different for the reduction and reformation steps because of thermodynamic and kinetic considerations. If it is assumed that the reaction mechanism of the single-stage process is a combination of the reduction and reformation steps, then a compromise may be required as to the overall reaction conditions selected for single-stage process. Also, by separating the two steps, the desired individual reactions may not only be optimized, but also unwanted side reactions may be minimized, both by selection of equipment and reaction conditions favoring the desired reaction and by the ability to separately remove the formed products from the reduction reaction vessel, thereby resulting in a more complete overall reaction.

Referring to FIG. 2, the sulfite-carbonate mixture which enters heat exchange 14 at a temperature of about 425±25° C. leaves this heat exchanger, increased in temperature, by way of a conduit 32 and passes through a heater 33 which is optionally utilized for further increasing the temperature of the mixture, where required, to about 500±25° C. The mixture leaves heater 33 through a conduit 34 where it is fed to a trickle distributor 35 in a reducer unit 36. While other liquid-solid contact techniques may be used, it is generally preferred to trickle the molten liquid over the solid carbonaceous bed in order to obtain optimum contact conditions for the reduction reaction. For a gaseous feed material used as a source of reactive carbon, a spray distributor is preferably used for the molten liquid, the solid carbonaceous bed being eliminated.

The chemical reaction in reducer 36 involves reduction of the alkali metal sulfite to alkali metal sulfide by treatment of the alkali metal sulfite-carbonate melt with a carbonaceous material effectively providing reactive carbon as a reductant, preferably in solid or liquid form so as to provide maximum contact, and preferably in the form of active carbon because of its fine porosity and high surface area. The term carbonaceous material includes hydrocarbons which decompose or dissociate to provide the reactive carbon, and hence some hydrogen, water, or other reaction products may also be formed and present in the reducer unit. However, reaction conditions, as described, are selected to optimize the reduction step of the two-stage process. The reduction reaction proceeds in accordance with the following exemplary equations:

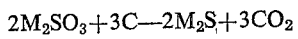

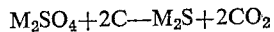

Thermodynamically, the negative free energy of reaction for these equations increases with increasing temperature and therefore would be favored at higher temperatures. Temperatures between 450 and 550° C. are principally utilized and preferred. Depending in part upon the particular carbonaceous source selected, the reaction parameters, including relative proportions of feedstock and carbonaceous material, temperature, pressure, and solid-liquid, liquid-liquid, or gas-liquid contact conditions, are selected so as to favor the foregoing principal reactions and minimize the effects of competing side reactions. Thus any carbonaceous material providing an effective source of reactive carbon may be utilized. From the point of view of process economics, waste carbonaceous materials ordinarily heavily contaminated with sulfur-containing materials, as obtained from petroleum- and coal-refining processes, are ideally suitable as feedstocks for use in the practice of the present invention. To provide a more rapid initial reaction, a source of active carbon is initially utilized, other sources of carbon, such as petroleum coke, asphalts, tars, pitches, or the like then being used subsequently.

Referring to FIG. 2, a source of carbon 37 is used to provide a carbonaceous material by way of a screw feed 38 to a supported bed 39 in reducer unit 36. The molten sulfite-carbonate mixture trickling from distributor 35 reacts with the carbon in bed 39 at a temperature of 500±25° C., the carbon generally being present in excess, the sulfite being reduced to sulfide. The molten alkali metal sulfide-carbonate is collected in a sump 40 at the base of reducer 36. The sulfide-carbonate mixture is pumped from sump 40 through a conduit 41 by way of a pump 42, then through a conduit 43 to a heat exchanger 44 where it loses heat. The molten mixture is then fed through a conduit 45 into a spray distributor 46 in a reformer or regenerator unit 47. Other liquid-gas contact methods may be used, as previously described as a substitute for spray distributor 3. Heat exchangers 14 and 44 are ordinarily part of the same heat exchanging unit, but have been shown as separate units in the schematic diagram for clarity of illustration.

The gas mixture produced in the reduction reaction consists principally of carbon dioxide in accordance with the previously shown equations. It will also contain minor amounts of other gaseous components. This gas mixture is rapidly removed from reducer unit 36 to prevent reaction with formed sulfide. The resultant gas mixture passes through a demister 48, which removes entrained liquid particles therefrom, the gas then leaving reducer 36 by way of a conduit 49. Any carbon dioxide in excess of that utilized in the subsequent reformation step is vented to the atmosphere by way of a conduit 50, suitably valved, and joins a stream of desulfurized flue gas leaving absorber 2 just prior to entry into heat exchangers 9.

For the reformation step, at least a portion of the carbon dioxide leaving reducer 36 by way of conduit 49 is fed by way of a valved conduit 51 through a cooler 52 and enters the base of regenerator unit 47 by way of a conduit 53 at a reduced temperature of 425±25° C. A source of steam 54 is utilized to provide steam by way of a conduit 55 to regenerator unit 47 at an elevated temperature, the reformation reaction proceeding in accordance with the following exemplary equations:

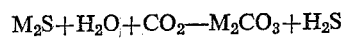

The reformation reaction is favored at lower temperatures, below 450° C., at which the sulfide-containing melt is molten. Where only sulfide and carbon is present in the melt, a temperature range of 395–450° C. is suitable, a range of 400–425° C. being preferred. With other salt diluents present that lower the melting point, a temperature range of 325–450° C. is suitable, a range of 375–425° C. being preferred. The molten sulfide-carbonate mixture sprayed from distributor 46 reacts with the regenerant gas mixture. Molten alkali metal carbonate, including both regenerated and carrier carbonate, is collected in sump 56 at the base of regenerator 47, from where it is fed by way of a conduit 57 by means of a pump 58 through a conduit 59 to storage vessel 4. The reconverted carbonate is then recycled to absorber unit 2 by way of a conduit 5.

Depending upon reaction conditions, the hydrogen sulfide-rich gas mixture produced in the two-stage reaction is similar to that obtained in the one-stage reaction, and also may contain minor amounts of COS, $CO_2$, and $H_2O$. This gas mixture passes through a demister 60, which removes entrained liquid particles, and leaves regenerator 47 by way of a conduit 61 where it is fed to a storage vessel 31, of a hydrogen sulfide processing plant.

To obtain sulfuric acid, the hydrogen sulfide-rich gas obtained from either the single-stage or two-stage regeneration is oxidized to $SO_2$, which is then catalytically converted to $SO_3$ by a chamber process or contact process, the $SO_3$ being then absorbed in 98–99 wt. percent sulfuric acid. Alternatively, the $H_2S$-rich mixture is fed to a reactor for conversion to elemental sulfur. The hydrogen sulfide feedstock provided by the present process is ideally suitable for conversion to sulfuric acid or to sulfur on an industrial scale by the foregoing well-known techniques. The selection of the final product, i.e., sulfuric acid or sulfur, will be determined generally by economic and marketing considerations.

The following examples illustrate the practice of the invention but are not intended to unduly limit its generally broad scope.

EXAMPLE 1

Single-stage reaction

The feasibility of a single-stage reaction of an alkali metal sulfite-carbonate melt, according to the following equation, was investigated:

$$M_2SO_3 + H_2C \rightarrow M_2CO_3 + H_2S$$

The reaction vessel used consisted of a stainless steel bomb constructed in such a manner that an inlet gas could be bubbled through the melt contained therein where so desired. A stainless steel screen spot-welded to the reaction vessel walls was used for supporting the bed of carbon used. This bed was located below the melt level so that the melt could contact both the carbon and the inlet gas simultaneously. Provision was also made for taking a molten salt sample periodically for analysis as well as for monitoring the off gas. The bomb contained green petroleum coke that had been activated with high pressure steam and was 6–14 mesh size. The coke had a maximum ash content of 5%. The mixture of alkali metal carbonates ($M_2CO_3$ where M=K, Li, Na) corresponded to the ternary eutectic composition. This mixture was premelted and ground prior to insertion in the bomb. The bomb was inverted initially and $SO_2$ bubbled in to charge the carbonate melt with sufite without contacting the coke. Hydrogen gas was fed to the vessel which was inverted so that the melt contacted both the coke and the incoming hydrogen gas simultaneously. The off gas was monitored for evolved hydrogen sulfide by bubbling the exit gas through an acidified aqueous cadmium nitrate solution. The exit gas was also checked by gas chromatography for hydrogen sulfide as well as other possible gases, e.g., $CO_2$, CO, $H_2O$, COS, and $CS_2$. The reaction using carbon and hydrogen was carried out for 3 hours over a temperature range of 450–625° C. Hydrogen sulfide gas was detected both by gas chromatographic analysis as well as by the large amount of yellow cadmium sulfide precipitated when the off gas was bubbled through an acidified aqueous cadmium nitrate solution, thereby indicating the successful use of carbon and hydrogen for simultaneously regenerating the sulfite-containing carbonate melt in a single-stage reaction.

EXAMPLE 2

Reduction of alkali metal sulfite by carbon

The reduction step of the two-stage process was evaluted according to the following equation:

$$2M_2SO_3 + 3C \rightarrow 2M_2S + 3CO_2$$

Thermodynamically, both for sulfite or sulfate as starting material, conversion to $M_2S$ and formation of carbon dioxide is favored, particularly with increasing temperature, although other competing reactions are present. Two runs were made in pressure vessels using appropriate amounts of lithium carbonates, potassium carbonate, and sodium sulfite to form the molten carbonate eutectic upon complete regeneration. In one run a coconut shell charcoal was used. In a second run a green petroleum coke was used. The bombs were evacuated and inserted in a rocking furnace, and the rate of pressure build up with time was followed. Both gas samples and the melt composition were analyzed. The reactions were carried out at 500° C., but reaction was observed to commence near 400° C. and was very rapid, maximum pressure being obtained in less than one hour without rocking. The maximum pressure was 60–80 p.s.i.g., indicating about 15–25% completion of the reaction. Gas chromatographic analysis clearly indicated that the desired reaction had occurred, the gas being essentially 100% $CO_2$. Both runs showed essentially similar results. Analysis of the melt showed that formation of $M_2S$ had occurred, other reaction products also being present.

EXAMPLE 3

Reformation reaction

The reformation step of the two-stage process shown in S.N. 779,176 may be utilized for reforming the products obtained in the reduction step of the present invention. As described therein, a synthetic mixture was prepared consisting of lithium carbonate, sodium carbonate, potassium carbonate, and sodium sulfite, these salts being mixed in suitable proportions (43 wt. percent carbonate ion) so that upon reformation there would be present the proper ratio of cations corresponding to the eutectic composition. These mixed salts were placed in a reaction vessel and heated. Carbon dioxide was saturated with water by bubbling through water at 80° C. and heated to prevent the condensation of water in the lines. Flow of the gas mixture was started when the salt reached a temperature of 300° C. In about 30 minutes, even before all the salt had melted, most of the sulfite had been removed. Analysis of the melt indicated that 75–95% of the sulfite was removed, and that the carbonate ion content had increased from the original 43% to about 60% by weight, corresponding to the composition of the alkali metal carbonate eutectic.

The absorption stage shown in U.S. 3,438,722 may be utilized for providing the sulfite-containing feedstock for the single-stage and two-stage process of the present invention. As described therein, in one series of runs the feed gas consisted of $CO_2$ containing 0.1–20 vol. percent $SO_2$. The molten carbonate melt consisted of a ternary mixture of the carbonates of lithium, sodium, and potassium of approximately eutectic composition and was maintained at a temperature of about 500° C. The flow of $SO_2$ through the melt was varied from 1.5 to 24 cc./min. The inlet gas was preheated to about 400° C. before contacting the melt.

The final concentration of resultant alkali metal sulfite and molten carbonate varied from about 10 to 19.1 mole percent sulfide for feed gases having an initial concentration ranging from 1 to 18.2 vol. percent $SO_2$. Material balance analyses based on wet chemical analysis and gas chromatographic analysis together with continuous monitoring of the off flue gas show that more than 99.9% of the $SO_2$ content was removed from the simulated flue gas.

It will, of course, be realized that many variations in reaction conditions may be used in the practice of this invention, depending in part upon the particular sulfur oxide content of the flue gas to be desulfurized, as well as the hydrocarbon or fossil fuel serving as a source of combustion gas. The term "hydrocarbon or fossil fuel" broadly includes carbonaceous fuels such as coal, oil-shale, petroleum products, natural gas, and associated waste products such as acid sludges and tars.

While certain exemplary reactions have been described for the absorption and regeneration steps, it has been found, particularly with respect to the regeneration stage, that the actual mechanism of reaction is a highly complex one and several competing reactions may occur simultaneously. Therefore, to optimize each of the absorption and regeneration stages, varying reaction temperatures and pressure may be employed, as well as the use of catalysts and means for providing greater surface contact between the reductant and regenerant gases and the melts. Also, there may be employed a batch process or a continuous process, preferably the latter, with the usual provision for recycle of various unreacted or partially reacted components. Further, even where the desired reactions do not go to completion and products are also present produced by competing or undesired side reactions, the unreacted or undesired products may be recycled in the process without substantial interference with the basic absorption and regeneration stages. Thus, while the examples illustrating this invention have been described with respect to specific concentrations, times, temperatures, and other reaction conditions, the invention may be otherwise practiced, as will be readily apparent to those skilled in this art. Accordingly, this invention is not to be limited by the illustrative and specific embodiments thereof, but its scope should be determined in accordance with the claims thereof.

I claim:
1. The process for recovering sulfur values as hydrogen sulfide gas from alkali metal sulfates, alkali metal sulfites, or mixtures thereof which comprises providing an inorganic molten salt containing said alkali metal sulfates, alkali metal sulfites, or mixtures thereof, as reactive material therein, reacting said molten salt at a temperature of at least 350° C. with
   (a) a carbonaceous material providing a source of reactive carbon to form alkali metal sulfides which are then further reacted, or
   (b) a hydrocarbonaceous material providing a source of reactive carbon and hydrogen,
to thereby form alkali metal carbonates in said molten salt and hydrogen sulfide gas as a recoverable product.

2. The process for recovering sulfur values as hydrogen sulfide gas from alkali metal sulfites which comprises providing an inorganic molten salt containing said alkali metal sulfites as reactive material therein, reacting said molten salt at a temperature of at least 350° C. with
   (a) a carbonaceous material providing a source of reactive carbon to form alkali metal sulfides which are then further reacted, or
   (b) a hydrocarbonaceous material providing a source of reactive carbon and hydrogen,
to thereby form alkali metal carbonates in said molten salt and hydrogen sulfide gas as a recoverable product.

3. The process according to claim 2 wherein the molten salt containing alkali metal sulfites is contacted at a temperature between 350 and 650° C. with a hydrocarbonaceous material providing a source of reactive carbon and hydrogen to thereby form alkali metal carbonates in said molten salt and hydrogen sulfide gas as a recoverable product.

4. The process according to claim 3 wherein said contact temperature is maintained between 450 and 550° C.

5. The process according to claim 3 wherein said hydrocarbonaceous material providing a source of reactive carbon and hydrogen is
   (a) a hydrogen-containing gas and a carbonaceous material, or
   (b) a simple or complex hydrocarbonaceous composition.

6. The process according to claim 5 wherein the source of reactive hydrogen is hydrogen gas and the source of reactive carbon is carbon black, charcoal, or coke.

7. The process for recovering sulfur values as hydrogen sulfide gas from alkali metal sulfites which comprises providing an inorganic molten salt containing said alkali metal sulfites as reactive material therein, and
   in a first reaction step of reduction, reacting said inorganic molten salt at a temperature of at least 350° C. with a carbonaceous material providing a source of reactive carbon to form alkali metal sulfides in the molten salt and a gaseous mixture containing carbon dioxide, separately recovering the molten salt containing the alkali metal sulfides and said resultant gaseous mixture, and
   in a second reaction step, reacting said molten salt containing alkali metal sulfides with a gaseous mixture containing carbon dioxide and steam to form alkali metal carbonates in said molten salt and hydrogen sulfide gas as a recoverable product.

8. The process according to claim 7 wherein in the reduction step the reaction temperature is maintained between 450 and 550° C.

9. The process according to claim 7 wherein in the reduction step the source of reactive carbon is carbon black, charcoal, or coke.

10. The process according to claim 7 where, in the second step, at least a portion of the resultant gaseous mixture obtained from the reduction step is utilized to provide said gaseous mixture containing carbon dioxide and steam.

References Cited

UNITED STATES PATENTS 3,438,727  4/1969  Herédy _____ 23—181

OSCAR R. VERTIZ, Primary Examiner

C. B. RODMAN, Assistant Examiner

PO-1050
(5/69)

UNITED STATES PATENT OFFICE
CERTIFICATE OF CORRECTION

Patent No. 3,574,543    Dated April 13, 1971

Inventor(s) L. A. Heredy

It is certified that error appears in the above-identified patent and that said Letters Patent are hereby corrected as shown below:

Column 2, line 37 after "wherein" delete ".";
Column 2, line 38 "Sulfur" should read --sulfur--;
Column 2, line 65 in the equation: "C+$H_2$ —— $M_2CO_3$" should re --C+$H_2$ → $M_2CO_3$.
Column 3, approx. line 24 in the equation: "+$CO_2$ —— $M_2CO_3$" s read --+$CO_2$ → $M_2CO_3$--.
Column 4, line 4 "connect" should read --convert--;
Column 4, approx. line 7 in the equation: "+$SO_2$ —— $M_2SO_3$" sh read --+$SO_2$ → $M_2SO_3$--;

Column 7, line 40 "exchange" should read --exchanger--;
Column 7, approx. line 70 in the equation: "+3C —— $2M_2S$" shc read --+3C → $2M_2S$--;
Column 7, approx. line 72 in the equation: "+2C —— $M_2S$" shou read --+2C → $M_2S$--.
Column 8 approx. line 63 in the equation: "+$CO_2$ —— $M_2CO_3$" sh read --+$CO_2$ → $M_2CO_3$--.
Column 9, approx. line 38 in the equation: "+$H_2$C —— $M_2CO_3$" should read --+$H_2$ + C → $M_2CO_3$--.
Column 10 approx. line 6 in the equation: "+3C —— $2M_2S$" shou read --+3C → $2M_2S$--.

Signed and sealed this 25th day of December 1973.

(SEAL)
Attest:

EDWARD M. FLETCHER, JR.
Attesting Officer

RENE D. TEGTMEYER
Acting Commissioner of Pate